INVENTOR.
M.E. REINECKE
BY
Young & Quigg
ATTORNEYS

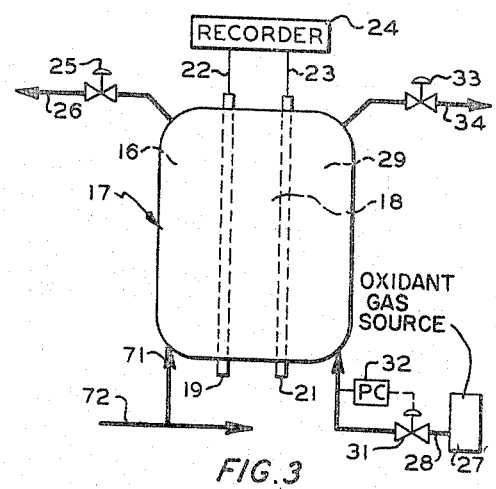

United States Patent Office 3,342,558
Patented Sept. 19, 1967

3,342,558
ELECTRICAL MEASURING SYSTEM UTILIZING A FUEL CELL
Marvin E. Reinecke, Bartlesville, Okla., assignor to Phillips Petroleum Company, a corporation of Delaware
Filed Apr. 18, 1962, Ser. No. 188,409
3 Claims. (Cl. 23—232)

This invention relates to measuring method and apparatus. In one aspect the invention relates to the utilization of a fuel cell as a detector. In another aspect the invention relates to the utilization of a fuel cell as a detector in a chromatographic analysis system.

In yet another aspect the invention relates to the utilization of a fuel cell to detect the presence of combustible gases. In a still further aspect the invention relates to the utilization of a fuel cell for determining the relative hydrocarbon content of drilling muds.

In another aspect the invention relates to the utilization of a fuel cell measuring the rate of flow of a fluid. In a still further aspect the invention relates to the utilization of a fuel cell to measure the pressure of a fluid. In yet another aspect the invention relates to the utilization of a fuel cell for measuring mechanical movement. In a still further aspect the invention relates to the utilization of a fuel cell for the measurement of the variations in thickness of a material. In yet another aspect the invention relates to the utilization of a fuel cell for the detection of variations in the composition and/or presence of foreign material in an electrolyte fluid.

Research over the past few years has developed the fuel cell into a commercial device for the generation of electricity. The fuel cell can be defined as an electro-chemical device in which the chemical energy of a fuel is converted directly and usefully into direct current electrical energy. A fuel cell is in essence a pair of electrodes in contact with an electrolyte contained in a suitable structure, with provisions for introducing a fuel to one electrode and an oxidant to the other electrode. Suitable fuels include hydrogen, natural gas, propane, butane, kerosene, methyl alcohol, ethyl alcohol, and the like. Suitable oxidants are oxygen and air. Electrolytes such as aqueous sulfuric acid, aqueous potassium hydroxide and the like have been used. Electrodes are commonly made of carbon, preferably impregnated with a metal catalyst such as platinum, palladium, silver, and the like which are relatively inactive chemically under the conditions of use. An example of a cell which can be operated at a relatively high temperature is disclosed in U.S. Patent 2,830,109 to E. Justi et al., issued Apr. 8, 1958. An example of a fuel cell which can be operated at a relatively low temperature is described in U.S. Patent 2,913,511 to W. T. Grubb, issued Nov. 17, 1959.

In accordance with one embodiment of the invention it has been discovered that a fuel cell can be utilized as a detector cell in a chromatographic analysis system. In accordance with another embodiment of the invention it has been discovered that a fuel cell can be utilized to detect the presence of combustible fluids. In accordance with another embodiment of the invention it has been discovered that a fuel cell can be utilized to measure pressure variations of a fluid. In accordance with a still further embodiment of the invention it has been discovered that a fuel cell can be utilized to measure the rate of flow of a fluid. In yet another embodiment of the invention it has been discovered that a fuel cell can be utilized to determine variations in the composition of a fluid which is suitable for use as an electrolyte. In accordance with another embodiment of the invention it has been discovered that a fuel cell can be utilized to measure mechanical movement.

Accordingly it is an object of the invention to provide novel means for determining the composition of a fluid. Another object of the invention is to provide an improved chromatographic analysis system. Another object of the invention is to provide novel method and apparatus for detecting the presence of a combustible fluid. Yet another object of the invention is to provide novel apparatus and method for determining the hydrocarbon content of drilling muds. A still further object of the invention is to provide novel method and apparatus for determining the pressure or rate of flow of a fluid. Another object of the invention is to provide novel method and apparatus for determining variations in composition of a fluid which is suitable for use as an electrolyte. A still further object of the invention is to provide novel method and apparatus for detecting and/or measuring a mechanical movement. A still further object of the invention is to provide novel method and apparatus for measuring the thickness of material.

Other aspects, objects, and the advantages of the invention will be apparent from a study of the disclosure, the drawings, and the appended claims to the invention.

In the drawings—

FIGURE 3 is a schematic representation of apparatus in accordance with the invention for determining pressure or rate of flow of a fluid;

FIGURE 4 is a schematic representation of a fuel cell which can be utilized to determine the variations in composition of fluid which is suitable for use as an electrolyte; and FIGURE 5 is a schematic representation of a system for measuring the thickness of a sheet of material.

Figure 1:
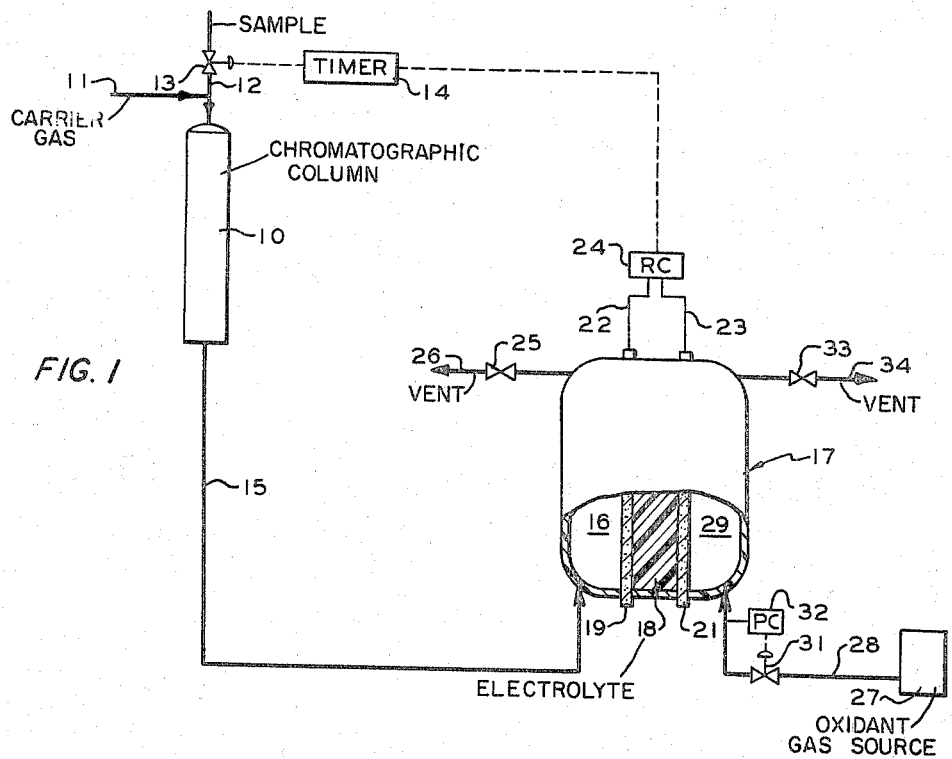
FIGURE 1 is a schematic representation of chromatographic analysis system in accordance with the invention.

Referring now to the drawing and to FIGURE 1 in particular there is shown a conventional chromatographic column 10 which is provided with a packing material that selectively retards passage therethrough of constituents of a mixture to be analyzed. A carrier gas is introduced into the first end of column 10 through a conduit 11. A sample conduit 12 having a valve 13 therein communicates with the first end of column 10. Valve 13 is opened periodically for a preselected time interval by means of a timer 14 so as to introduce a predetermined volume of fluid sample to be analyzed into column 10. Although shown schematically, valve 13 can be any type of sample valve known in the art which permits the introduction of a predetermined volume of fluid sample.

A conduit 15 removes the effluent from column 10 and passes the effluent to the fuel chamber 16 of fuel cell 17. Fuel cell 17 comprises an ion permeable membrane 18 positioned between and in electrical contact with electrodes 19 and 21. Membrane 18 serves as the electrolyte for the fuel cell. Leads 22 and 23 connected to electrodes 19 and 21, respectively, are utilized to transmit the electrical output of the fuel cell to the inputs of recorder 24. The effluent from column 10 is supplied to electrode 19 through line 15 and chamber 16. A valve 25 is provided in outlet line 26 to exhaust any impurities which enter chamber 16 and/or any inert material which is a product of reaction of the fuel gas. The oxidant gas, which can be oxygen or air, is transmitted from a source 27 thereof through line 28 to chamber 29. Line 28 can contain a valve 31 which can be regulated responsive to the pressure in chamber 29 by pressure controller 32. A valve 33 is provided in outlet line 34 for the withdrawal of impurities in the oxidant gas. A detailed description of a fuel cell which is suitable for use is set forth in U.S.

Patent 2,913,511 the description of which is incorporated herein by reference. While fuel cell 17 has been illustrated in FIGURES 1, 2 and 3 as a fuel cell utilizing a solid membrane as the electrolyte, any suitable fuel cell known in the art can be utilized. Thus fuel cell 17 in FIGURES 4 and 5 has a fluid electrolyte.

Before the sample fluid is introduced into column 10, a carrier gas flows through conduits 11 and 15 at a predetermined pressure and rate of flow to fuel cell 17. Fuel cell 17 will produce an output which can be designated as the reference output. Valve 13 is then opened to introduce a sample to column 10. The carrier gas elutes the constituents or components of the sample from the column in sequence so that fuel cell 17 responds sequentially to these individual components. Any variations in the output of fuel cell 17 from the reference output will be due to the presence of the separated components of the sample in the effluent from column 10. Thus when hydrogen is utilized as the carrier gas, the presence of a component in the effluent of column 10 will reduce the output of fuel cell 17 from the reference output by an amount representative of the concentration of the component in the sample and at a time representative of the individual component. Where hydrogen is used as the carrier gas the components of the sample can be combustible materials and/or non-combustible materials. When a combustibly inert carrier gas, such as helium, is used, the reference output of fuel cell 17 will be zero and the presence of combustible components of the sample in the effluent from column 10 will cause fuel cell 17 to produce an output voltage, the amplitude of which is representative of the concentration of the component in the sample and the time of occurrence of which is representative of the particular component.

Figure 2:
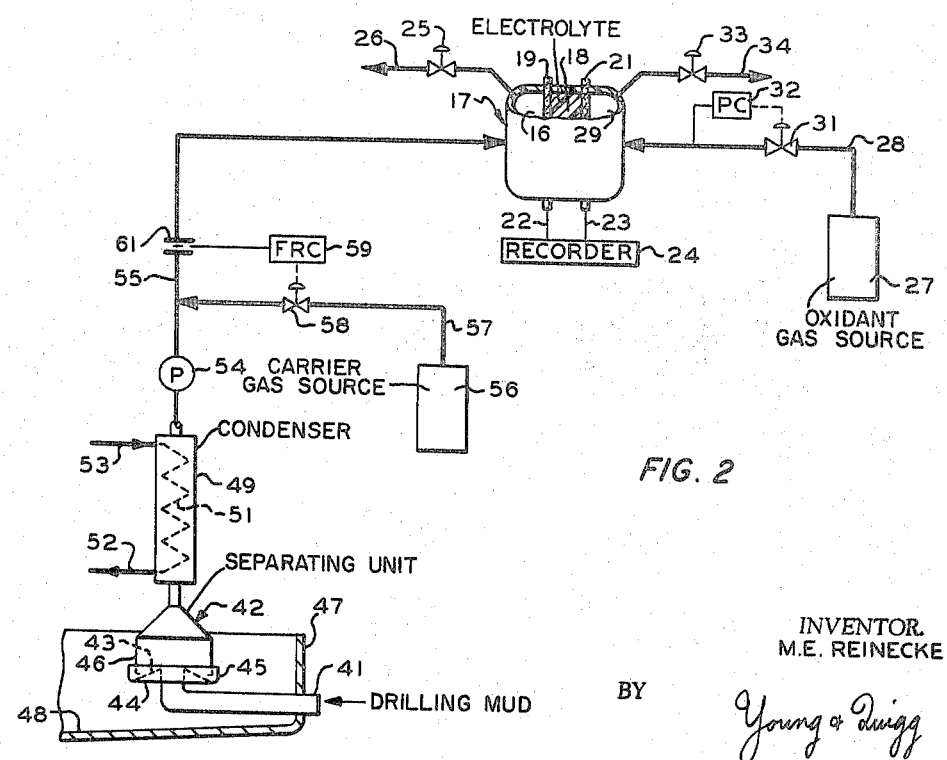
FIGURE 2 is a schematic representation of an apparatus in accordance with the invention for determining the presence of combustible gases in drilling muds.

Referring now to FIGURE 2 there is shown apparatus for detecting and/or measuring the amount of combustible gas in a drilling mud. Drilling mud is conveyed through line 41 into separating unit 42. As the mud emerges from the upright positioned outlet of branch conduit 41, it flows along a downwardly inclined surface 43 of a generally frusto-conical member 44 which is secured to the upper end of conduit 41. In this manner the mud stream flowing from conduit 41 is spread out over the downwardly sloping surface, thereby creating a condition favorable to the maximum release of the hydrocarbon and other gases contained therein. The mud flows down surface 43 and then upwardly between upwardly projecting flange 45 on the outer edge of member 44 and the vertical sidewall 46 of separating unit 42 to overflow into a container 47 which can have a downwardly inclined surface 48 leading to a shale shaker, mud pit, or other part of the surface circulatory system. Flange 45 and surface 43 thus form a channel. The sidewall of hood 46 can be positioned with respect to member 44 to prevent the entry of air into separation unit 42. With the lower end of hood 46 located in the channel and closely spaced to surface 43, the mud can pass between the surface 43 and hood 46 while gases escaping from the mud are retained within hood 46.

Any gases contained in the drilling mud are separated out in the separation unit 42 and passed upwardly through a condenser unit 49 which has a coil 51 positioned therein and connected to an inlet 53 and an outlet 52 so that cold water or other cooling fluid can be circulated through coil 51. In condenser 49 any water vapor contained in the gases removed from the drilling mud is condensed and drops back into separation unit 42 and is removed along with the mud. The cooled gases are withdrawn from condenser unit 49 by pump 54 and passed through line 55 to fuel chamber 16 of fuel cell 17. For purposes of simplicity the components of the fuel cells of the various figures which are identical to each other are labeled with the corresponding numbers.

If desired a source 56 of suitable carrier gas, such as hydrogen, can be provided. The carrier gas is withdrawn from source 56 and transmitted through line 57 and valve 58 to line 55 wherein it is mixed with the gases withdrawn from separation unit 42. A flow rate controller 59, which is responsive to the pressure drop across an orifice 61 in line 55, can be utilized to manipulate valve 58 to maintain a predetermined flow of gases into fuel chamber 16. Where the carrier gas is a combustibly inert gas or where a carrier gas is not used, the reference output of fuel cell 17 will be substantially zero and the presence of any combustible gases in the drilling mud will result in an output voltage which is representative of the relative concentration of the combustible gases. If desired a chromatographic column can be utilized to separate the gases into individual components so that the concentration of each component can be determined. If hydrogen is used as the carrier gas, the presence of combustible gases in the drilling mud will lower the value of the electrical output of fuel cell 17.

Referring now to FIGURE 3 the fuel inlet 71 of fuel cell 17 is connected to conduit 72. Valve 25 in outlet line 26 can be set so that the flow of gas through chamber 16 is representative of the rate of flow of fluid through conduit 72. If it is desired to measure the pressure in a container such as conduit 72, the output of fuel cell 17 can be calibrated in terms of pressure. A source of fuel, such as hydrogen, can be utilized and the rate of flow of the fuel to chamber 16 controlled by suitable means, such as pressure controlled valves, to vary said rate of flow of fuel responsive to the pressure or rate of flow of the fluid in conduit 72. The flow of oxidant can be manipulated instead of the flow of fuel, if desired.

Referring now to FIGURE 4 there is shown a fuel cell adapted to detect and/or measure the variations in composition of a material which is suitable for use as an electrolyte in a fuel cell. A suitable fuel, such as hydrogen, is transmitted from source 81 through line 82 to fuel chamber 16 in fuel cell 17. A valve 83 is located in line 82 and can be actuated by pressure controller 84 responsive to the pressure in fuel chamber 16. The fluid to be analyzed is passed through inlet line 85, electrolyte chamber 18′, wherein it serves as the electrolyte for the fuel cell, and through outlet line 86. As the supply of fuel and oxidant to chambers 16 and 29, respectively, is maintained at substantially constant flow rates, any variations in the electrical output of fuel cell 17 will be indicative of the change in character of the electrolyte fluid. Thus the presence and relative concentration of contaminant materials can readily be determined. Also the presence and the relative concentration of materials which are weaker or stronger electrolytes than the reference electrolyte can be determined.

Referring now to FIGURE 5 fuel cell 17 contains an electrolyte chamber 18″ having an overflow chamber 91 located in a portion thereof. The electrolyte contained in chamber 18″ must be fluid in nature. Electrode 21′ is secured to the casing of fuel cell 17 by means of a deformable element 92 located around the circumference of electrode 21′. A shaft 93 is fixedly secured to electrode 21′. Thus the movement of shaft 93 will cause electrode 21′ to move closer to or further away from electrode 19. The electrolyte in chamber 18″ moves into and out of chamber 91 as electrode 21′ is moved toward and away from electrode 19, respectively. As the supply of oxidant and fuel gas to chamber 29 and 16, respectively, is maintained constant the electrical output of fuel cell 17 is representative of the spacing between electrodes 19 and 21′, and thus the movement of shaft 93.

While the system of FIGURE 5 can be utilized to measure any mechanical movement, one particular application in which the system can be utilized is the measurement of the variation and thickness of a sheet of material 94. Sheet 94 can be transported by belt 93 across rollers 96. A roller 97 can be mounted on the end of shaft 93 adjacent sheet 94. One of the rollers 96 can be positioned directly opposite roller 97 to prevent distortion of the path of movement of belt 95. Shaft 93 can be biased by a suitable means to hold roller 97 against the surface of sheet 94. Thus shaft 93 can be provided with a flange 98 to which is attached one end of spring 99. The other end of spring 99 can be secured to a fixed object. Thus any variation in the thickness of sheet 94 will result in movement of shaft 93, causing the output of fuel cell 17 to be representative of the thickness of sheet 94.

It is within the contemplation of the invention that recorder 24 in each of the figures be any one or more of recording means, visual detecting means, and control circuits. It is further within the contemplation of the invention that the output of the fuel cell can be utilized to control a variable of the process with which it is associated.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not means that such a piece of equipment is intended to be omitted simply because it does not appear in the drawing.

Suffice to say, the drawing is for illustrative purposes, as is the description thereof.

Reasonable variation and modification are possible within the scope of the foregoing disclosure, the drawings and the appended claims to the invention.

I claim:

1. A chromatographic analysis system comprising a chromatographic column; a source of carrier gas; means for flowing said carrier gas from said source through said column; a source of a mixture to be analyzed; means for introducing a sample of said fluid mixture to be analyzed from said source thereof into said column; at least one of said carrier gas and said mixture to be analyzed comprising a combustible material; first and second electrodes; an electrolyte positioned between and in contact with said first and second electrodes; means for supplying the effluent from said column to said first electrode; a source of an oxidant; means for supplying an oxidant from said source of an oxidant to said second electrode; and means for measuring the electrical output between said first and second electrodes, whereby a decrease in said electrical output is representative of the concentration of a respective constituent of said mixture when said carrier gas is hydrogen and an increase in said electrical output is representative of the concentration of a respective constituent of said mixture when said carrier gas is a noncombustible gas and the respective component is a combustible material, and the time of occurrence of such change is indicative of the identity of said respective constituent.

2. A method of analyzing a fluid mixture comprising flowing a carrier gas through a chromatographic separation zone, introducing a sample of a mixture to be analyzed into said separation zone, at least one of said mixture and said carrier gas comprising a combustible material supplying the effluent from said separation zone to the fuel electrode of a fuel cell, supplying an oxidant to the oxidant electrode of said fuel cell, and measuring the electrical output of said fuel cell, whereby a decrease in said electrical output is representative of the concentration of a respective constituent of said mixture when said carrier gas is hydrogen and an increase in said electrical output is representative of the concentration of a respective constituent of said mixture when said carrier gas is a noncombustible gas and the respective component is a combustible material, and the time of occurrence of such change is indicative of the identity of said respective constituent.

3. A method of detecting the presence of combustible gases in a fluid the composition of which can vary due to the presence of said combustible gases, comprising supplying a sample of said fluid to the fuel electrode of a fuel cell, supplying an oxidant to the oxidant electrode of said fuel cell, and measuring the electrical output between said fuel electrode and said oxidant electrode, whereby an increase in said electrical output is indicative of the presence of combustible gases in said fluid.

References Cited

UNITED STATES PATENTS

| | | | |
|---|---|---|---|
| 2,913,511 | 11/1959 | Grubb | 136—86 |
| 3,006,836 | 10/1961 | Cole. | |
| 3,012,087 | 12/1961 | Billiard et al. | 136—160 |
| 3,141,796 | 7/1964 | Fay et al. | 136—86 |
| 3,149,921 | 9/1964 | Warner | 23—232 |
| 3,150,998 | 9/1964 | Reitemeir | 136—86 |
| 3,160,577 | 12/1964 | Nolan | 136—86 X |
| 3,206,332 | 9/1965 | Juda | 136—86 |
| 3,216,911 | 11/1965 | Kronenberg | 204—1.1 |

MORRIS O. WOLK, *Primary Examiner.*

F. U. STRADER, C. F. ROBERTS, J. SCOVRONEK,
*Assistant Examiners.*